US007065483B2

(12) United States Patent
Decary et al.

(10) Patent No.: US 7,065,483 B2
(45) Date of Patent: Jun. 20, 2006

(54) COMPUTER METHOD AND APPARATUS FOR EXTRACTING DATA FROM WEB PAGES

(75) Inventors: Michel Decary, Montreal (CA); Jonathan Stern, Newton, MA (US); Kosmas Karadimitriou, Shrewsbury, MA (US); Jeremy W. Rothman-Shore, Cambridge, MA (US)

(73) Assignee: Zoom Information, Inc., Waltham, MA (US)

( * ) Notice: Subject to any disclaimer, the term of this patent is extended or adjusted under 35 U.S.C. 154(b) by 1004 days.

(21) Appl. No.: 09/910,169

(22) Filed: Jul. 20, 2001

(65) Prior Publication Data

US 2002/0091688 A1    Jul. 11, 2002

Related U.S. Application Data

(60) Provisional application No. 60/221,750, filed on Jul. 31, 2000.

(51) Int. Cl.
*G08F 17/28* (2006.01)

(52) U.S. Cl. ............. 704/7; 704/9; 704/10; 707/3; 707/5; 707/6

(58) Field of Classification Search ............ 704/4, 704/9, 7, 10; 707/3, 5, 6, 4, 9
See application file for complete search history.

(56) References Cited

U.S. PATENT DOCUMENTS

| 4,270,182 A | * | 5/1981 | Asija ............... 704/8 |
|---|---|---|---|
| 5,319,777 A | | 6/1994 | Perez |
| 5,764,906 A | | 6/1998 | Edelstein et al. |
| 5,813,006 A | | 9/1998 | Polnerow et al. |
| 5,835,905 A | | 11/1998 | Pirolli et al. |
| 5,895,470 A | | 4/1999 | Pirolli et al. |
| 5,918,236 A | | 6/1999 | Wical |
| 5,923,850 A | | 7/1999 | Barroux |

(Continued)

FOREIGN PATENT DOCUMENTS

AU    A-53031/98    8/1998

(Continued)

OTHER PUBLICATIONS

ABCNEWS.com, Apr. 28, 1999. http://web.archive.org/web/19990428185649/abcnews.go.com/.

(Continued)

*Primary Examiner*—Tālivaldis Ivars Šmits
*Assistant Examiner*—Minerva Rivero
(74) *Attorney, Agent, or Firm*—Hamilton, Brook, Smith & Reynolds, P.C.

(57) ABSTRACT

Computer method and apparatus for extracting information from a Web page is disclosed. The invention apparatus is formed of an extractor coupled to receive Web pages from a source. The extractor uses natural language processing to extract desired information from the Web page. A storage subsystem receives from the extractor the extracted desired information and stores the extracted desired information in a database. The invention method for extracting data from a Web page includes the computer implemented steps of (i) using natural language processing, finding possible formal names on a given Web page, (ii) using pattern matching, searching the given Web page for formal names not found by the natural language processing, and (iii) refining a combined set of the found formal names to produce a working set of people and organization names extracted from the given Web page. The refining includes determining aliases of respective people and organization names, so as to effectively reduce duplicate names.

45 Claims, 6 Drawing Sheets

U.S. PATENT DOCUMENTS

| | | | |
|---|---|---|---|
| 5,924,090 A | 7/1999 | Krellenstein | |
| 6,052,693 A * | 4/2000 | Smith et al. | 707/104.1 |
| 6,065,016 A | 5/2000 | Stuntebeck et al. | |
| 6,076,088 A * | 6/2000 | Paik et al. | 707/5 |
| 6,094,653 A | 7/2000 | Li et al. | |
| 6,112,203 A | 8/2000 | Bharat et al. | |
| 6,122,647 A | 9/2000 | Horowitz et al. | |
| 6,128,613 A | 10/2000 | Wong et al. | |
| 6,212,552 B1 | 4/2001 | Biliris et al. | |
| 6,253,198 B1 | 6/2001 | Perkins | |
| 6,260,033 B1 | 7/2001 | Tatsuoka | |
| 6,266,664 B1 | 7/2001 | Russell-Falla et al. | |
| 6,269,369 B1 | 7/2001 | Robertson | |
| 6,301,614 B1 | 10/2001 | Najork et al. | |
| 6,314,409 B1 | 11/2001 | Schneck et al. | |
| 6,336,108 B1 | 1/2002 | Thiesson et al. | |
| 6,336,139 B1 | 1/2002 | Feridun et al. | |
| 6,349,309 B1 | 2/2002 | Aggarwal et al. | |
| 6,377,936 B1 | 4/2002 | Henrick et al. | |
| 6,389,436 B1 | 5/2002 | Chakrabarti et al. | |
| 6,418,432 B1 | 7/2002 | Cohen et al. | |
| 6,463,430 B1 * | 10/2002 | Brady et al. | 707/3 |
| 6,466,940 B1 | 10/2002 | Mills | |
| 6,493,703 B1 | 12/2002 | Knight et al. | |
| 6,529,891 B1 | 3/2003 | Heckerman | |
| 6,553,364 B1 | 4/2003 | Wu | |
| 6,556,964 B1 | 4/2003 | Haug et al. | |
| 6,601,026 B1 * | 7/2003 | Appelt et al. | 704/9 |
| 6,618,717 B1 | 9/2003 | Karadimitriou et al. | |
| 6,640,224 B1 | 10/2003 | Chakrabarti | |
| 6,654,768 B1 | 11/2003 | Celik | |
| 6,668,256 B1 | 12/2003 | Lynch | |
| 6,675,162 B1 | 1/2004 | Russell-Falla et al. | |
| 6,697,793 B1 * | 2/2004 | McGreevy | 707/1 |
| 6,745,161 B1 * | 6/2004 | Arnold et al. | 704/7 |
| 6,859,797 B1 | 2/2005 | Skopicki | |
| 2001/0009017 A1 | 7/2001 | Biliris et al. | |
| 2003/0221163 A1 | 11/2003 | Glover et al. | |
| 2003/0225763 A1 | 12/2003 | Guilak et al. | |

FOREIGN PATENT DOCUMENTS

| | | |
|---|---|---|
| AU | A-53031-98 | 8/1998 |
| AU | A 53031/98 | 8/1998 |
| JP | 10-320315 | 12/1998 |
| WO | WO 99/67728 | 12/1999 |
| WO | WO 00/33216 | 6/2000 |

OTHER PUBLICATIONS

COMPAQ, Apr. 22, 1999. http://web/archive.org/web/19990422222242/www.compaq.com/.

Dwi H. Widyantoro, Thomas R. Ioerger, John Yen. "An Adaptive Algorithm for Learning Changes in User Interests". Nov. 1999. ACM. p. 405-412.

Soumen Chakrabarti, Byron Dom, Piotr Indyk. "Enhanced hypertext categorization using hyperlinks". 1998 ACM. pp. 307-318.

Sahami, M. et al., "SONIA: A Serive for Organizing Networked Information Autonomously," *3rd ACM Conference on Digital Libraries, Digital 98 Libraries*, Jun. 23-26, 1998, pp. 200-209.

Nir Friedman, Moises Goldszmidt, "Building Classifiers using Bayesian Networks". From Proceedings of the National Conference on Artificial Intelligence (AAAI96). pp. 1277-1284.

Lorrie Faith Cranor and Brian A. LaMacchia, "Spam!" Communications of the ACM, Aug. 1998. vol. 4, No. 8, pp. 74-83.

PCT International Search Report PCT/US01/22425.

PCT International Search Report PCT/US01/23343.

A.K. Jain et al. "Data Clustering: A Review." ACM Computing Surveys, vol. 31, No. 3, Sep. 1999, pp. 264-323.

Hall, Robert J. "How to Avoid Unwanted Email." Communications of the ACM, Mar. 1998. vol. 41, No. 3, pp. 88-95.

Pazzani, M. et al., "Learning from hotlists and coldlists: Towards a WWW information filtering and seeking agent," *Proc. International Conference on Tools with Artificial Intelligence*, Los Alamitos, CA, 1994, pp. 492-495.

Lam, W. and K. Low, "Automatic Document Classification Based on Probabilistic Reasoning: Model and Performance Analysis," *1996 IEEE Conference on Computational Cybernetics and Simulation*, Orlando, FL 1997, pp. 2719-2723.

PCT International Search Report PCT/US01/22385, Dec. 18, 2002 (4 pp).

PCT International Search Report PCT/US01/22430, Jan. 17, 2003, 4 pp.

PCT International Search Report PCT/US01/22381, Feb. 12, 2003, 3 pp.

PCT International Search Report PCT/US01/24162, Feb. 13, 2003, 4 pp.

Ball, T. and F. Douglis, "An Internet Difference Engine and its Applications," *Proceedsings of COMPCON '96, IEEE Comp. Soc. Press*, Feb. 25, 1996, p. 71-76.

Freitag, D., "Machine Learning for Information Extraction in Informal Domains," *Machine Learning 39:2/3* (169-202), May/Jun. 2000, p. 169-202.

Kjell, B., "Authorship Attribution of Text Samples Using Neural Networks and Bayesian Classifiers," *IEEE Int. Conf. on Systems, Man, and Cybernetics*, vol. 2, Oct. 5, 1994, pp. 1660-1664.

Singhal, M., "Update Transport: A New Technique for Update Synchronization in Replicated Database Systems," *IEEE Transactions on Software Engineering 16:12* (1325-1336), Dec. 1, 1990.

PCT International Search Report PCT/US01/41515, Feb. 28, 2003, 4 pp.

Langer, A. and J.S. Rosenschein, "Using Distributed Problem Solving to Search the Web," *Proc. 4th Int. Conf. on Autonomous Agents, ACM, USA*, Jun. 3-7, 2000, pp. 197-198.

International Search Report PCT/US01/22426, Mar. 17, 2003, 4 pp.

Guan, T. and K-F Wong, "KPS: a Web information mining algorithm," *Computer Networks 31:11-16* (1495-1507) May 17, 1999, Elsevier Science Publishers B.V., Amsterdam.

Miller, R.C. and K. Bharat; "SPHINX: a framework for creating personal, site specific Web crawlers," *Computer Networks and ISDN Systems, 30:1-7* (119-130) Apr. 1, 1998, North Holland Publishing, Amsterdam.

Powell, T.A. et al., *HTML Programmer's Reference, (Appendices A and B)*, Osborne/McGraw-Hill, 1998 (pp. 355-377).

Miller, M., "The Complete Idiot's Guide to Online Search Secrets," *Que*, 2000, pp. 172-179.

* cited by examiner

COMPUTER METHOD AND APPARATUS FOR EXTRACTING DATA FROM WEB PAGES

RELATED APPLICATION

This application claims the benefit of U.S. Provisional Application No. 60/221,750 filed on Jul. 31, 2000. The entire teachings of the above application are incorporated herein by reference.

BACKGROUND OF THE INVENTION

Generally speaking a global computer network, e.g., the Internet, is formed of a plurality of computers coupled to a communication line for communicating with each other. Each computer is referred to as a network node. Some nodes serve as information bearing sites while other nodes provide connectivity between end users and the information bearing sites.

The explosive growth of the Internet makes it an essential component of every business, organization and institution strategy, and leads to massive amounts of information being placed in the public domain for people to read and explore. The type of information available ranges from information about companies and their products, services, activities, people and partners, to information about conferences, seminars, and exhibitions, to news sites, to information about universities, schools, colleges, museums and hospitals, to information about government organizations, their purpose, activities and people. The Internet became the venue of choice for every organization for providing pertinent, detailed and timely information about themselves, their cause, services and activities.

The Internet essentially is nothing more than the network infrastructure that connects geographically dispersed computer systems. Every such computer system may contain publicly available (shareable) data that are available to users connected to this network. However, until the early 1990's there was no uniform way or standard conventions for accessing this data. The users had to use a variety of techniques to connect to remote computers (e.g. telnet, ftp, etc) using passwords that were usually site-specific, and they had to know the exact directory and file name that contained the information they were looking for.

The World Wide Web (WWW or simply Web) was created in an effort to simplify and facilitate access to publicly available information from computer systems connected to the Internet. A set of conventions and standards were developed that enabled users to access every Web site (computer system connected to the Web) in the same uniform way, without the need to use special passwords or techniques. In addition, Web browsers became available that let users navigate easily through Web sites by simply clicking hyperlinks (words or sentences connected to some Web resource).

Today the Web contains more than one billion pages that are interconnected with each other and reside in computers all over the world (thus the term "World Wide Web"). The sheer size and explosive growth of the Web has created the need for tools and methods that can automatically search, index, access, extract and recombine information and knowledge that is publicly available from Web resources.

The following definitions are used herein.

Web Domain

Web domain is an Internet address that provides connection to a Web server (a computer system connected to the Internet that allows remote access to some of its contents).

URL

URL stands for Uniform Resource Locator. Generally, URLs have three parts: the first part describes the protocol used to access the content pointed to by the URL, the second contains the directory in which the content is located, and the third contains the file that stores the content:

<protocol>:<domain><directory><file>
  For example:
  http://www.corex.com/bios.html
  http://www.cardscan.com/index.html browsers access the URL as if the http://prefix was used. In addition, the <file> part may be missing. In that case, the convention calls for the file "index.html" to be fetched.

For example, the following are legal variations of the previous example URLs:
  www.corex.com/bios.html
  www.cardscan.com
  fn.cnn.com/archives/may99/pr37.html
  ftp://shiva.lin.com/soft/words.zip Web Page Web page is the content associated with a URL. In its simplest form, this content is static text, which is stored into a text file indicated by the URL. However, very often the content contains multi-media elements (e.g. images, audio, video, etc) as well as non-static text or other elements (e.g. news tickers, frames, scripts, streaming graphics, etc). Very often, more than one files form a Web page, however, there is only one file that is associated with the URL and which initiates or guides the Web page generation.

Web Browser

Web browser is a software program that allows users to access the content stored in Web sites. Modem Web browsers can also create content "on the fly", according to instructions received from a Web site. This concept is commonly referred to as "dynamic page generation". In addition, browsers can commonly send information back to the Web site, thus enabling two-way communication of the user and the Web site.

As our society's infrastructure becomes increasingly dependent on computers and information systems, electronic media and computer networks progressively replace traditional means of storing and disseminating information. There are several reasons for this trend, including cost of physical vs. computer storage, relatively easy protection of digital information from natural disasters and wear, almost instantaneous transmission of digital data to multiple recipients, and, perhaps most importantly, unprecedented capabilities for indexing, search and retrieval of digital information with very little human intervention.

Decades of active research in the Computer Science field of Information Retrieval have yield several algorithms and techniques for efficiently searching and retrieving information from structured databases. However, the world's largest information repository, the Web, contains mostly unstructured information, in the form of Web pages, text documents, or multimedia files. There are no standards on the content, format, or style of information published in the Web, except perhaps, the requirement that it should be understandable by human readers. Therefore the power of structured database queries that can readily connect, combine and filter information to present exactly what the user wants is not available in the Web.

Trying to alleviate this situation, search engines that index millions of Web pages based on keywords have been developed. Some of these search engines have a user-friendly front end that accepts natural languages queries. In general, these queries are analyzed to extract the keywords the user is possibly looking for, and then a simple keyword-based search is performed through the engine's indexes. However, this essentially corresponds to querying one field only in a database and it lacks the multi-field queries that are typical on any database system. The result is that Web queries cannot become very specific; therefore they tend to return thousands of results of which only a few may be relevant. Furthermore, the "results" returned are not specific data, similar to what database queries typically return; instead, they are lists of Web pages, which may or may not contain the requested answer.

In order to leverage the information retrieval power and search sophistication of database systems, the information needs to be structured, so that it can be stored in database format. Since the Web contains mostly unstructured information, methods and techniques are needed to extract data and discover patterns in the Web in order to transform the unstructured information into structured data.

The Web is a vast repository of information and data that grows continuously. Information traditionally published in other media (e.g. manuals, brochures, magazines, books, newspapers, etc.) is now increasingly published either exclusively on the Web, or in two versions, one of which is distributed through the Web. In addition, older information and content from traditional media is now routinely transferred into electronic format to be made available in the Web, e.g. old books from libraries, journals from professional associations, etc. As a result, the Web becomes gradually the primary source of information in our society, with other sources (e.g. books, journals, etc) assuming a secondary role.

As the Web becomes the world's largest information repository, many types of public information about people become accessible through the Web. For example, club and association memberships, employment information, even biographical information can be found in organization Web sites, company Web sites, or news Web sites. Furthermore, many individuals create personal Web sites where they publish themselves all kinds of personal information not available from any other source (e.g. resume, hobbies, interests, "personal news", etc).

In addition, people often use public forums to exchange e-mails, participate in discussions, ask questions, or provide answers. E-mail discussions from these forums are routinely stored in archives that are publicly available through the Web; these archives are great sources of information about people's interests, expertise, hobbies, professional affiliations, etc.

Employment and biographical information is an invaluable asset for employment agencies and hiring managers who constantly search for qualified professionals to fill job openings. Data about people's interests, hobbies and shopping preferences are priceless for market research and target advertisement campaigns. Finally, any current information about people (e.g. current employment, contact information, etc) is of great interest to individuals who want to search for or reestablish contact with old friends, acquaintances or colleagues.

As organizations increase their Web presence through their own Web sites or press releases that are published on-line, most public information about organizations become accessible through the Web. Any type of organization information that a few years ago would only be published in brochures, news articles, trade show presentations, or direct mail to customers and consumers, now is also routinely published to the organization's Web site where it is readily accessible by anyone with an Internet connection and a Web browser. The information that organizations typically publish in their Web sites include the following:
  Organization name
  Organization description
  Products
  Management team
  Contact information
  Organization press releases
  Product reviews, awards, etc
  Organization location(s)
. . . etc . . .

SUMMARY OF THE INVENTION

One purpose of the present invention is to collect publicly available information about people and organizations published in the Web. Usually information about organizations is published in Web sites maintained by the organizations themselves and includes the above-mentioned information. However, very often relevant information can be collected by press releases, news articles, product reviews and other independent sources.

As to the present invention collecting publicly available information about people from Web sources, such information may include:
  Last name, first name
  Employment information (company name, title, responsibilities)
  Biographical information (previous employment, educational degrees, expertise)
  Lists of Web links with references to a person (e.g. links to press releases that refer to some company CEO, links to journal databases that contain references on the papers on some researcher, etc)
  Contact information (address, phone number, FAX, email)
. . . etc . . .

This information is usually published in the Web either by people who publish their own resume, or by organizations who publish biographical and other information about their employees. In addition, other sources of such information include news sites, club and association sites, etc.

In the preferred embodiment of the invention, computer apparatus and method for extracting data from a Web page implements the steps of:
  (i) using a lexical analysis (i.e., natural language processing), finding possible formal names (organization names and/or people names) on a given Web page, the step of finding producing a first found set of formal names;
  (ii) searching (preferably using pattern matching techniques) the given Web page for formal names not found by the lexical analysis processing step of finding, said searching producing a second set of formal names; and
  (iii) refining a combined set of formal names formed of the first found set and the second set, said refining producing a working set of people and organization names extracted from the given Web page.

The lexical analysis syntactically and grammatically identifies elements (e.g., noun phrases, element groupings across multiple lines) of interest.

The step of refining includes rejecting predefined (common phrase) formal names as not being people names of interest. Further, the step of refining includes determining aliases of respective people and organization names in the combined set, so as to reduce effective duplicate names.

In the preferred embodiment, the step of finding further finds addresses, telephone numbers, email addresses, professional titles and organization for which a person named on the given Web page holds that title. The step of finding further includes determining educational background and other biographical information (i.e., employment history) relating to a person named on the given Web page. The determined educational background information includes at least one of name of institution, degree earned from the institution and date of graduation from the institution.

Preferably, the invention apparatus and method is rules based. In one embodiment, the invention apparatus and method determine type/structure of Web page, structure or arrangement of contents of the Web page, type or purpose of each line and/or regular recurrence of a certain type of line (or pattern of elements) in the subject Web page. As such, desired people/organization information is extracted as a function of pattern/placement of the contents or determined line and/or page types and determined boundaries of elements of interest.

In accordance with another aspect of the present invention, subsets of lines are grouped together to form text units. The invention extracts from the formed text units desired people and/or organization information.

In accordance with a further aspect of the invention, additional information regarding a person or organization named on a given Web page is deduced. The additional information supplements information found on another Web page of a same Web site as the given Web page.

In a preferred embodiment, a database stores the extracted information, and a post processor normalizes (standardizes, reduces duplicates, etc.) the stored data.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 4:
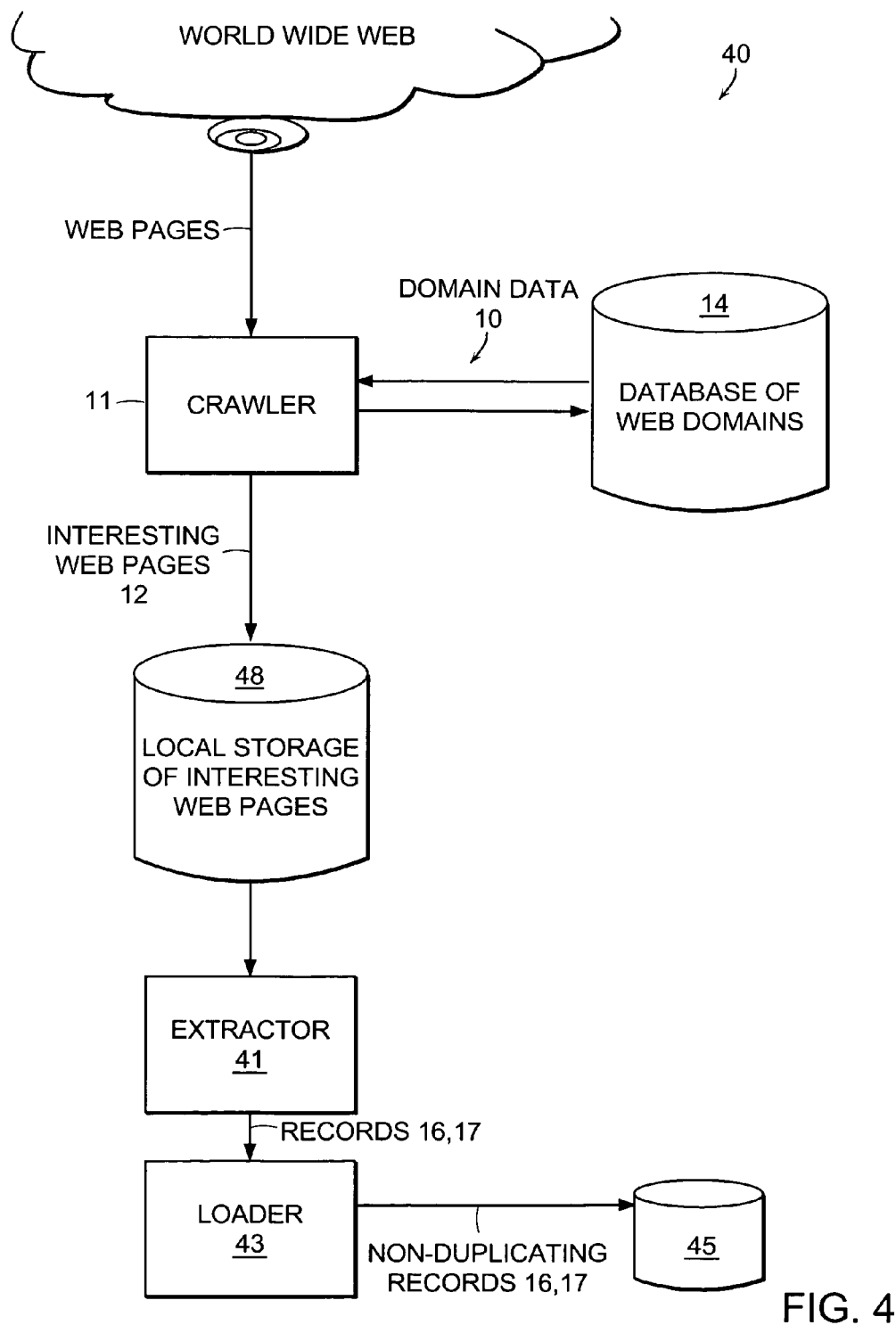
FIG. 4 is a schematic view of a computer system embodying the present invention.

With reference to FIG. 4, a computer system 40 embodying the present invention is composed of the following three major components:

The Crawler 11

The component referred to as "Crawler" 11 is a software robot that "crawls" the Web visiting and traversing Web sites with the goal of identifying and retrieving pages 12 with relevant and interesting information.

The Extractor 41

The "Extractor" 41 is the component that performs data extraction on the pages 12 retrieved by the Crawler 11. This data extraction in general is based on Natural Language Processing techniques and uses a variety of rules to identify and extract the relevant and interesting pieces of information.

The Loader 43

Data produced by the extractor 41 are saved into a database 45 by the "Loader" 43. This component 43 also performs many post-processing tasks to clean-up and refine the data before storing information in database 45. These tasks include duplicate removal, resolving of aliases, correlating data produced from different Web sites, filtering and/or combining information, etc.

In the preferred embodiment, the Crawler 11 is a version of the software robot described in U.S. patent application Ser. No. 09/821,908 filed on Mar. 30, 2001 for a "Computer Method and Apparatus for Collecting People and Organization Information from Web Sites" and assigned to the assignee of the present invention. Specific rules are used to identify pages that contain organization information or relevant people information (e.g. name, employment, contact info, etc). For example, pages with a street address of the organization, press release pages, product list pages, pages that contain information about the management team, employee directory, etc. All the interesting pages 12 that the Crawler 11 collects are then passed (through a local storage 48) to the Extractor 41 for further processing and data extraction.

The role of the Extractor 41 is to extract information about people and/or organizations from a single Web page. For people, the extractor 41 has to find all mentions of a person, identify information related to people and associate it with the right person. For organizations, the extractor 41 must identify all occurrences of organization names, identify information related to the organizations and recognize descriptive paragraphs of texts related to an organization.

The original source of data on which the extractor 41 operates is in the form of text (in possibly different formats: plain text, html, rtf, etc.). Alternatively, these texts are converted to a standard format where the boundary of each sentence is clearly located and in which each individual line of text is assigned various types (sentence, header line, copyright notice, other indications of purpose, etc.) and is associated with a series of style elements (bold, underlined, font size, etc).

Before specific data extraction is applied, the text is analyzed with Natural Language Processing (NLP) tools in order to obtain the following information The part-of-speech (e.g.: noun, verb, etc.) of all words in the text The position and boundaries of all noun phrases (any succession of nouns and adjectives) in the text.

The semantic type of some or all noun phrases in the text

The syntactic structure of all sentences in the text (e.g.: verbs and their subject, object and complements).

In the preferred embodiment of the present invention, these are obtained through the NLP techniques described in U.S. patent application Ser. No.09/585,320 filed on Jun. 2, 2000 for a "Method and Apparatus for Deriving Information from Written Text".

The Extractor 41 relies on rules and algorithms to identify people and organizations and to identify and link related information. Those rules and algorithms have many possible variations. In general, a variation on a rule or algorithm will result in a trade-off between coverage and accuracy. Depending on the final application for the extracted data, higher accuracy or higher coverage may be desirable. For instance, if the data is used as a database for a general search engine, more coverage is desirable even at the cost of lower accuracy. On the other hand, for instance, if the data is used to create mailing lists, higher accuracy is desirable. Everything that is described hereafter is understood in this context and the description of specific rules and algorithms is done in a general way and are meant to include such variations.

Figure 1:
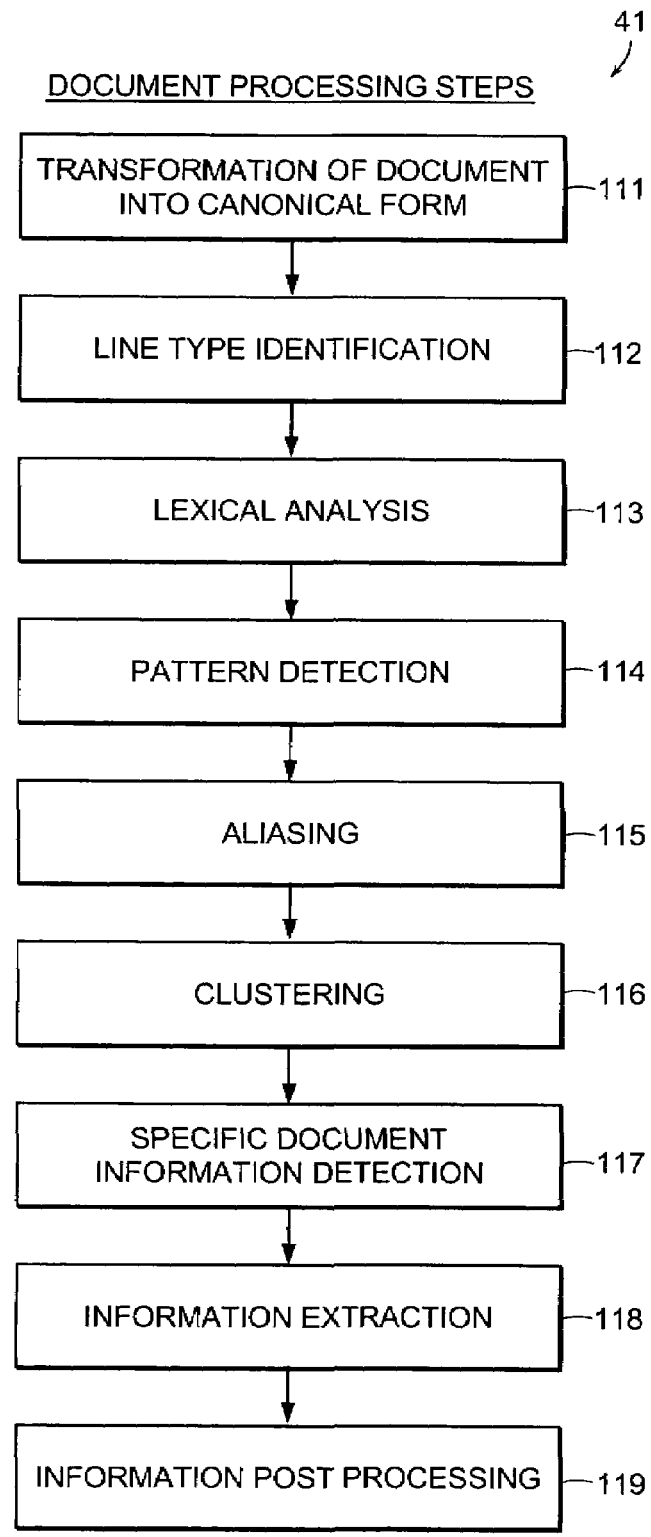
FIG. 1 is a flow diagram of an extractor process for processing a document in the preferred embodiment of FIG. 4.

FIG. 1 illustrates the document processing performed by the Extractor 41 in the preferred embodiment. First, the Extractor 41 transforms the subject document (Web page) into a canonical or standardized form (step 111). The way information about a person or organization is expressed and the meaning of such information varies according to the kind of Web page on which the information appear and, in particular, to the type of section inside a page (e.g.: board of directors, contacts at the end of a press release, staff list, member list, organization URL, stock ticker symbol, organization mission, product description, etc.). The type of a page is obtained through a process described in Invention 3 as disclosed in the related Provisional Application No. 60/221,750 filed on Jul. 31, 2000 for a "Computer Database Method and Apparatus", now pending as U.S. patent application Ser. No. 09/768,869, filed Jan. 24, 2001. However, for a particular page type, it is necessary to recognize different sections within the page and to discover the overall structure of the page. For this, Applicants have devised various methods as follows.

Recursively identifying the page structure: Many pages contain lists of elements often within a hierarchy. Once noun phrase types, specific headers and style tags have been identified, it is possible to deduce the overall structure of the page by recursively looking for patterns using the method described later in step 114. For instance, a page could consist of a list of states, then within each state a list of city, then within each city a list of companies and then within each company, a mailing address and a list of people. This is recognized by first locating the boundary of the smaller most embedded sections by identifying header lines that are more prominent than what follows OR by locating clusters of repeated patterns using the method of Step 114 (discussed later). At this point, clusters and headers at a higher level can then be detected to recognize higher level of hierarchies. Ultimately, this produces a structure of the complete page which can allow, among other things, to attribute the correct semantic type to noun phrases that could not be identified through regular noun phrase classification.

Recognizing Specific Headers: Applicants have devised mechanism to recognize specific headers and specific elements within a page (e.g.: navigation map, copyright notice, index). This mechanism is based on rules that specify specific keywords or family of keywords along with the way those keywords should appear (e.g.: by themselves, preceded by an organization name, at the end of a line, etc.). Some headers will allow to deduce specific special information.

Assigning Style Tags to lines: In order to recognize the structure of a page, it is necessary to recognize that some lines are more prominent than others and that different lines correspond to the same structural element. In order to do this, it is necessary, at least, to compute a style tag for each line on the page (step 112, FIG. 1). Because style elements can ultimately vary for each letter, this tag must be a high level abbreviation of styles found on the line in such a way that similar lines can be compared. The style tag combines, among others, the following information: bold, italic, underline, center, font size, bullet. For each of the first three style elements, at least the first word must be in bold, italics or underlined, respectively, in order for the element to be set to true. The style tag indicates "font size" determined by the biggest size on the line. Other variations are possible as long as interline comparison is meaningful.

After the line type is identified in step 112, Extractor 41 performs a lexical analysis 113 as further illustrated in FIG. 2 and detailed next.

Figure 2:
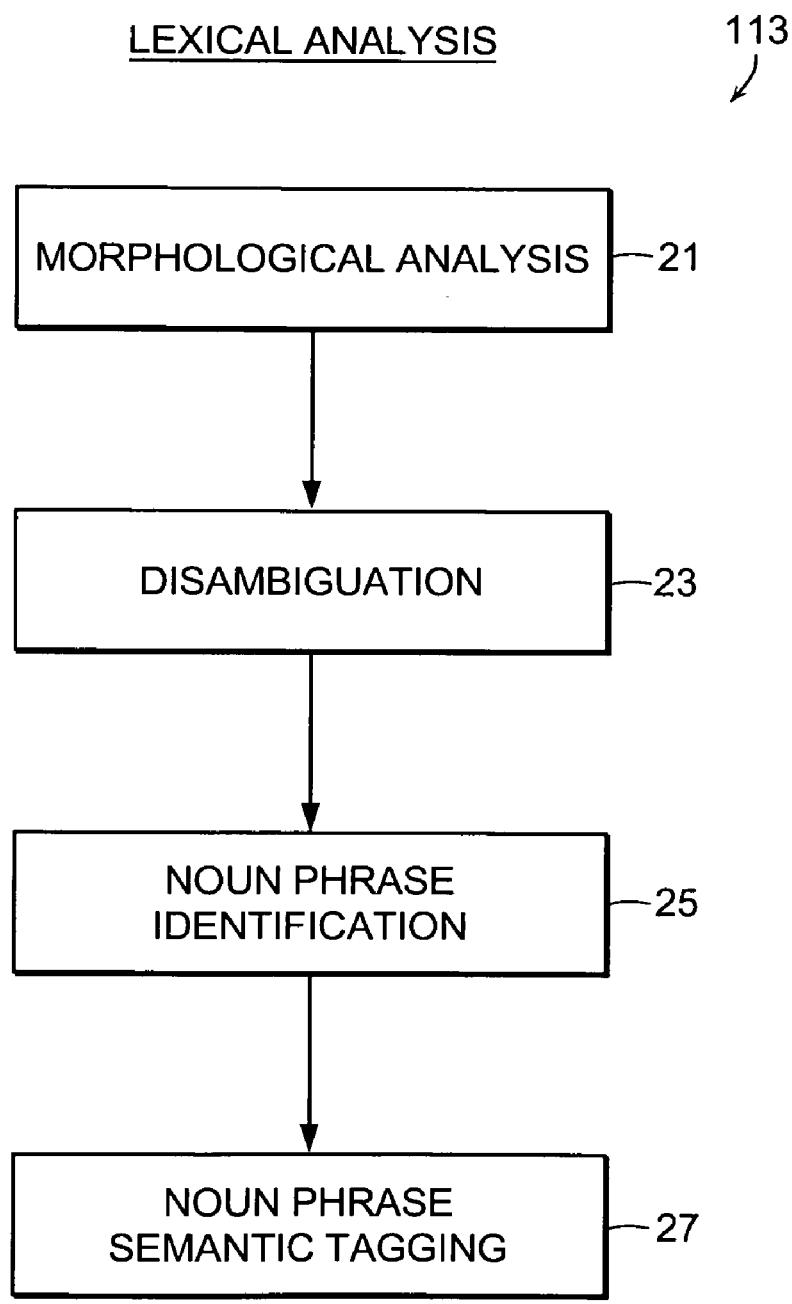
FIG. 2 is a flow diagram of functions performed during lexical analysis in the extractor process of FIG. 1.

Inside a text, all relevant pieces of information (names of people, titles, names of organizations, phone numbers, fax numbers, addresses, etc.) must be identified as such (step 21, FIG. 2). This is achieved through Natural Language Processing where the text is morphologically analyzed to retrieve all noun phrases and to assign a semantic type to those noun phrases. A similar process is followed for other types of noun phrases that are of interest. For instance, in one preferred embodiment of the invention, this has been done, among others, for: Title, Responsibility, City, State, Country, Educational Institution, Phone Number, e-mail address, etc. Other noun phrase types can also be defined following the same method.

Noun Phrase Detection: With the use of a tagger/disambiguator 23, the lexical analysis 113 recognizes all noun phrases in a text. The noun phrase recognition mechanism is rendered more precise by adding to the dictionary some lexical elements useful for name recognition. Those words are coupled with a corresponding semantic flag:

List of all common first names (SURNAME flag)

List of all common addresses, e.g.: Mr. Ms. Dr., etc. (ADDRESS flag)

List of all common name suffixes, e.g.: jr., III, esq., etc. (NAME_SUFFIX flag)

List of all common organization name identifiers, e.g., Corp., Inc., Ltd., LLC, etc.

List of all common organization name beginning keyword, e.g., Bank, League, Society, Association, etc.

Noun Phrase Typing: With the use of a noun phrase classifier joiner, the lexical analysis 113 identifies all noun phrases that could potentially correspond to a person's or organization's name (step 25). An example noun phrase classifier joiner is disclosed in U.S. patent application Ser. No. 09/585,320 filed Jun. 2, 2000, herein incorporated by reference. In order to identify such noun phrases, rules describing the composition of a NAME must be defined. Those rules define what are the different parts of a name and the different order in which they can appear. In the preferred embodiment, names of people have seven possible parts: Address, FirstName, Initial, MiddleName, NameParticle (e.g.: van, de), LastName, NameSuffix.

Names of organizations have specific organization keywords at the end (e.g., Inc., Ltd., LLD, etc.) or at the beginning (e.g., Bank of, Association, League of, etc.) Certain organization names are followed by a respective stock ticker symbol (e.g., ". . . Acme (NASDAQ:ACME) . . . ").

Each rule describes a possible combination of those parts where such combination can serve as a valid name. Each rule is a succession of "tokens". Each token specifies 4 things (elements in parenthesis are the symbols used in the preferred implementation):

if the token is optional or not (+ or −)
    if the word must be capitalized (C), not capitalized (S) or either way (M)
    the semantic type of the word (@ followed by a type), in one implementation, PL stands for pointed letters: 1 or 2 initials followed by a period
    the part of the name to which this word corresponds ("!" followed by a part name)

The following is a subset of the rules used in an example implementation

```
+1C@ADDRESS!Address   +1C!FirstName    −1C@PL!Initial    +1C!LastName
                      −1M@NSUF!NameSuffix
+1C@ADDRESS!Address   +1C!LastName     −1M@NSUF!NameSuffix
+1C@ADDRESS!Address   +1C!FirstName    +1C!MiddleName        +1C!LastName
                      −1M@NSUF!NameSuffix
+1C@SURNAME!FirstName +1C@PL!Initial     −1M@NSUF!NameSuffix
+1C@SURNAME!FirstName −1C@PL!Initial     +1C!LastName  −1M@NSUF!NameSuffix
+1C@SURNAME!FirstName +1C!MiddleName     +1C!LastName  −1M@NSUF!NameSuffix
+1C!FirstName         +1C@PL!Initial     +1C!LastName      −1M@NSUF!NameSuffix
+1C!FirstName         +1C!LastName       +1M@NSUF!NameSuffix
+1C@PL!FirstName      +1C!LastName       −1M@NSUF!NameSuffix
+1C@PL!FirstName      +1C!MiddleName +1C!LastName       −1M@NSUF!NameSuffix
```

All unrecognized capitalized noun phrases on a page are compared with all domains on the page. Those domains come from either: e-mail addresses, links, and/or explicit URLs. When a domain is matched, the unknown noun phrase is retyped as being an organization name. Matching is done by scanning each letter of the domain from left to right trying to match at least the first letter of each word in the noun phrase (backtracking if necessary). For instance "Federal Express" will match "FedEx", "International Business Machines" will match "IBM". A domain may contain more than one string separated by a period ("."). For instance "Apple Corporation" will match "info.apple". Different conditions may be imposed on the match depending on the desired trade-off between coverage and accuracy. In particular, it is possible to allow that not all words in the noun phrase be matched to at least one letter of the domain. For instance, a maximum number of unmatched words may be specified.

Referring now to noun phrase semantics (step 27, FIG. 2), noun phrase joining and splitting are performed where appropriate as follows.

Noun Phrase Joining: In some cases, names of people span across more than one noun phrase. In particular, this is the case when commas "," appear within a name (e.g.: "John Smith, Jr.", "Smith, John"). With the use of a noun phrase joiner (see patent application Ser. No. 09/585,320 filed on Jun. 2, 2000 for a "Method and Apparatus for Deriving Information from Written Text"), rules have been defined to (i) detect such construction, (ii) join the different parts in a single noun phrase and (iii) assign the correct name part to each word.

Noun Phrase Splitting: In many cases, improper punctuation or irregular format create a situation where the name of a person is immediately followed by a title or something else (e.g.: "John Smith Vice-President"). With the use of a noun phrase splitter (see patent application Ser. No. 09/585,320 filed on Jun. 2, 2000 for a "Method and Apparatus for Deriving Information from Written Text"), rules are defined to (i) detect such constructions, (ii) split the noun phrase into two parts at the appropriate point, and (iii) reanalyze the name so that correct name parts are assigned.

In some cases, the rules and algorithms described so far are not sufficient to identify the type of a particular noun phrase. This usually happens when the noun phrase is not surrounded by sufficient evidence. For example, there is not enough evidence to recognize a noun phrase such as "Kobir Malesh" as a NAME if it is not preceded by an address, does not contain a middle initial, and does not contain a known surname. However, analyzing the larger context where this noun phrase appears, it maybe found that it is part of a list that follows a specific pattern, for example:

John Williams, CEO and President, ADA Inc.
    Ted Brown, COO, Leda Corp.
    Kobir Malesh, President, Round Technologies Corp.

Likewise, some organization names use a different format and may be recognized by a certain pattern. For instance, law firms often have names of the pattern "Name, Name . . . & Name".

In these cases, identifying the pattern within the text offers a way to assign the proper type to the unknown noun phrase. Thus, step 114 pattern detection follows or is employed with the lexical analysis of step 113 in FIG. 1.

Rules are defined that recognize the repetition of certain line types and noun phrases (for instance a succession of lines where a NAME is followed by a TITLE) and that can reassign the proper type to noun phrases recognized as being part of such a pattern. For the purpose of pattern matching in step 114, only lines without verbs are considered for retyping (not sentences) and any succession of sentences and breaks are considered as one element. A pattern is recognized when at least two combinations of lines, sentences and breaks, with the same number of elements contain the same type of noun phrase in the same position on the same line. Furthermore, many variations are possible depending on the desired trade-off between coverage and accuracy. Those trade-offs concern:

The minimum number of repetitions of the pattern
    The maximum number of unknown noun phrases in the pattern
    A requirement or not to respect the line style (bold, italic, etc.)
    A requirement or not that a pattern element must occur immediately before or after the pattern element in which a noun phrase will be retyped
    A requirement or not that a pattern should not occur before the first or after the last recognized pattern (i.e. extending the pattern one element above or below).
    Accepting or not, extra lines in a pattern element.

Referring back to FIG. 1, name aliasing monitoring and processing 115 follows pattern detection step 114. Name Aliasing is performed on known names as follows. Once all names have been identified on a page, it is necessary to indicate which names refer to the same entity (person or organization). This is done by comparing all names 2 by 2. Two names are considered referring to the same person if at least the first name or last name matches and no parts present in both are conflicting. Furthermore, first name matching includes (i) identity of names ("Robert"="Robert"), (ii) Conversion of name to initial ("Robert"="R."), (iii) Conversion of name to nickname ("Robert"="Bob"). When looking for a potential alias for a name, it is preferable to look at other names in the inverse order in which they appeared starting at the name that it is attempted to alias. Information from all aliases of the same name are then combined into one general name (e.g.: "John Smith"+"Mr. Smith"="Mr. John Smith").

Organization name aliasing resolves IBM, International Business Machines Corporation, IBM Corp., IBM Corporation, and International Business Machines Corp. to the same organization. This is accomplished first by finding each word in the shorter name within the longer name. Organization identifiers such as Corporation are aliased so that Corp. and Corporation match each other. If all of the words in the shorter string match words in the longer string and in the right order and there are no leftover words in the shorter string, they are said to match (indicate the same organization). If there are leftover words in one string or the other (but not both) that are basic organization identifiers, like Corporation, they are also said to match.

If the names do not match according to the above process, but the shorter name contains an acronym, the aliasing step 115 checks if there is a string of words in the longer name such that one can construct the acronym by taking one or more letters from each word, in the right order. For example, IBM and International Business Machines Corp. or FedEx Corporation and Federal Express Corp. or Digital Equipment Corporation and DEC or American Express and AMEX. If there is such a group of words, the names are said to match.

Name Aliasing for unclassified noun phrases is performed as follows. Names that could not be recognized through normal noun phrase classification 113, pattern detection 114 or special construction can still be discovered by comparing them to the list of names found on the page. The Extractor 41 program looks at all capitalized noun phrases of one to three words that did not receive any semantic type. It then tries to see if any of those could match one of the names found. This is done by considering one word noun phrases as either a first name or last name, 2 words noun phrases as "first name"+"last name", and, 3 words noun phrases as "first name"+"middle name"+"last name". It then applies the aliasing mechanism described above. This would allow for instance to link "Kobir" to "Mr. Kobir Malesh".

Name Rejection: In some cases, names identified through the methods described will not be valid people's name or organization names. Different methods are used to reject names that were recognized by mistake:

Immediate context: for instance names preceded by "the" or "at"

Capitalization: for instance, combination of first name in full capitals and last name only initially capitalized Known Expression: for instance, the name is compared to a list of predetermined strings that are not qualified names of interest (e.g.: "Ann Arbor", George Washington Bridge", etc.)

Dictionary Checking: for instance, if the last name is a dictionary word (e.g.: "Paul Electricity" vs. "Paul Wood"), the Extractor 41 program checks if the last name is also flagged as being a potential family name. If not, it is rejected.

An example aliasing software routine 115 is as follows.

---

Aliasing algorithm 115

```
FOR_EACH semantic type Si (e.g. name, organization, etc.)
    Create an initially empty pool Pi of objects of type Si
    FOR_EACH noun phrase NPi of type Si in the document
        Accept or reject NPi based on filtering rules for type Si.
        IF NPi is accepted
            Check, among all elements in Pi, for an object Oi which
            is an alias of NPi based on aliasing rules for that type.
            IF such Oi exists,
                Add a link between NPi and Oi
            ELSE
                Create a new object Oi of type Si and link to Npi
                Add Oi to pool Pi
            END_IF
        END_IF
    END_FOR
    FOR_EACH noun phrase NPi of unknown type in the document
        Accept or reject NPi based on relaxed filtering rules for type Si.
        IF NPi is accepted
            Check, among all elements in Pi, for an object Oi which
            is an alias of NPi based on aliasing rules for that type.
            IF such Oi exists,
                Change type of NPi to type Si
                Add a link between NPi and Oi
            END_IF
        END_IF
    END_FOR
    FOR_EACH object Oi in Pi
        Determine the canonical name of object Pi based on assembling
        rules for type Si
    END_FOR
END_FOR
```

---

After aliasing 115 (FIG. 1) the Extractor 41 performs a clustering step 116. Clustering is the action of grouping some lines together in a text as one logical unit. It is needed for 2 reasons: (i) To identify the boundaries where information about people or organizations is to be found and (ii) To recognize elements of information that span across more than one line.

With regard to the former, Information Boundary, the following rules are used to identify the section where information about a person or organization are to be found.

If a line or sentence contains only one name or organization (or aliases) it is considered the beginning of a section. A section can also begin with a pronoun (such as "he") if the previous section ended very close by and the last alias matches the pronoun.

All sentences that follow are included in the section if it contains an alias of the name or organization or a relevent pronoun (for instance "he" for a man, "it" for a company).

All non-sentences that follow are included if they contain information that can be extracted (by looking at semantic type of noun phrases)

A section will end under the following conditions:
A second, different alias was found
No relevent "extractable" information was found
A structural boundary has occured (for instance, end of a table, prominent header line, etc.)

On lines with more than 1 name or alias, the clustering is done within the line itself (i.e. different parts of the line correspond to different short sections). The division is done according to different rules:

Each alias signals the start of a section (and the end of the previous one) within the line.

This start point is moved back if a title immediately precedes.

Certain symbols, such as a semi-colon, will mark the end of such sections.

Such sections can not extend over this single line

For elements of information that spans across more than one line, Extractor 41 proceeds as follows. Some combinations of lines have a special structure and are recognized by defining rules that describe this structure in terms of noun phrase types and succession of specific elements. This is the case for instance of addresses where the whole address is recognized as one logical information for the purpose of pattern matching and information extraction.

Similarly, paragraphs of company/organization information such as organization description, product description and organization mission are processed as one logical unit of information. Description paragraphs are preferably located by checking for some conditions and establishing a score. The best overall description on the whole subject Web site is considered the organization description. The following is pseudo code description of a preferred implementation. Many variations are understood to be possible and the below description is for purposes of illustration and not limitation of the present invention.

For a paragraph to be considered, it must obey the following conditions:

The first noun phrase of the paragraph must be capitalized and typed as either a Organization, Responsibility, or not typed. If it is only one word at the beginning of the sentence, it must be a non-dictionary word.

First sentence must not include a name or title.

The whole paragraph must not include more than one name or one title

If in a press release, it must not be the first paragraph

Then points are added according to the following list:

There is a line before the paragraph starting with "about"

First noun phrase of first paragraph is clearly an organization name

Main verb is a key description verb in the present tense (e.g.: be, provide, develop, market, produce, create)

Paragraph has key "description" nouns: (e.g.: leader, solution, mission, need, goal, service, product)

For a single page, the organization description is the paragraph with the highest score, plus all immediately preceding and following paragraphs that have been considered. If another organization description already exists (i.e., was previously identified) when a new one is computed, the best one will be chosen according to the following rules:

The description with the highest single paragraph score is chosen

If equal, the description with the highest combined score is chosen

If equal, the longest description is chosen.

Information about a person or organization can also be found outside of its cluster. The following cases are recognized in the preferred embodiment.

If a person's cluster is included inside an organization cluster, then this organization can be attached to titles given for this person.

If a title in the singular form appears immediately before a person cluster and this title is not part of another cluster, it can be included in the cluster.

Continuing with FIG. 1, specific document information is next detected at step 117. Knowing the type of a page (see Invention 3 as disclosed in the related Provisional Application No. 60/221,750 filed on Jul. 31, 2000 for a "Computer Database Method and Apparatus") enables one to locate information that will affect people and organization records or affect the way clusters are constructed. For instance:

Press release pages generally contain dates that can be used to datestamp information extracted from such pages.

Press release pages generally concern one specific organization. It can be assumed that people mentioned with titles but without an organization name can be linked to this press release organization.

Press release pages often contain a contact section at the end which has a recognizable format. If this contact section mentions a different organization than the organization which is the subject of the press release, it can be assumed that the different organization is a public relation company for the press release organization.

The press release organization can be identified among a list of noun phrase candidates using a Bayesian Engine or heuristics. Relevant tests can make use of the following information: presence in the first sentence of first paragraph, presence in the contact section, number of occurences and aliases, stock ticker symbol matching, subject of verbs like "announced", following the word "about", etc.

When pieces of personal information appear in a connected sentence, the logical relationship between each element (e.g.: title, company/organization, date) is expressed through the rules of the English language. In order to understand how those pieces of information are related, Natural Language Processing is employed in information extraction step 118. Sentences are syntactically parsed to obtain lexical frames representing potential relationships between words (see patent application Ser. No. 09/585,320 filed on Jun. 2, 2000 for a "Method and Apparatus for Deriving Information from Written Text"). Alternatively, those relationships can also be obtained through other NLP methods such as deterministic parsing. Those syntactical relations (or trees) are then searched for the appearance of pre-defined patterns corresponding to information that is of interest to the Extractor 41. Those patterns are referred to as "Semantic Frames".

In the preferred embodiment, a list of semantic frames are defined for (a) sentences that express a relationship of employment between a company and a person. This includes, for instance, such semantic frames as "work Subject: [PERSON] as:[TITLE] for: [COMPANY]", and, (b) sentences that express that a person holds a certain degree, for instance "graduated Subject:[PERSON] from:[INSTITUTION] with:[DEGREE] in:[DISCIPLINE]". Included in the former are semantic frames that recognize an organization as an object of certain verbs, such as "joined" (as in " . . . joined ACME in 1998") and "was employed" (as in " . . . was employed by ACME . . . "). Other semantic frames for other types of personal or organization information can be defined using the same method. Semantic frames can also indicate how the resulting database record 16, 17 should be constructed from elements matching the frame (see patent application Ser. No. 09/585,320 filed on Jun. 2, 2000 for a "Method and Apparatus for Deriving Information from Written Text"). Once a sentence has been parsed, all possible semantic frames are applied. Successful matches lead to the creation of database or working records 16, 17 (FIG. 4).

Figure 5A:
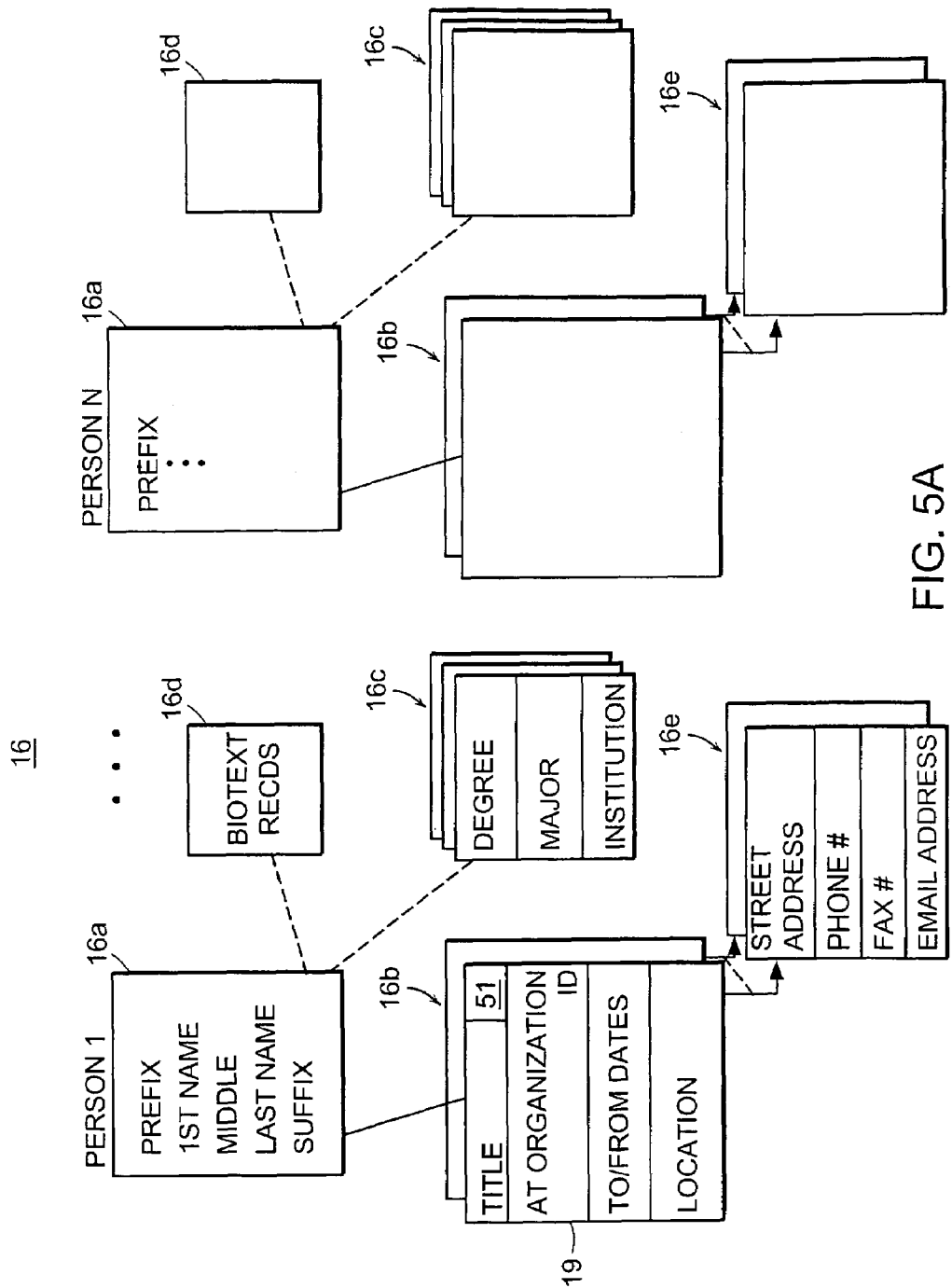
FIGS. 5a and 5b are block diagrams of working database records storing information extracted by the extractor of FIG. 1.
Figure 5B:
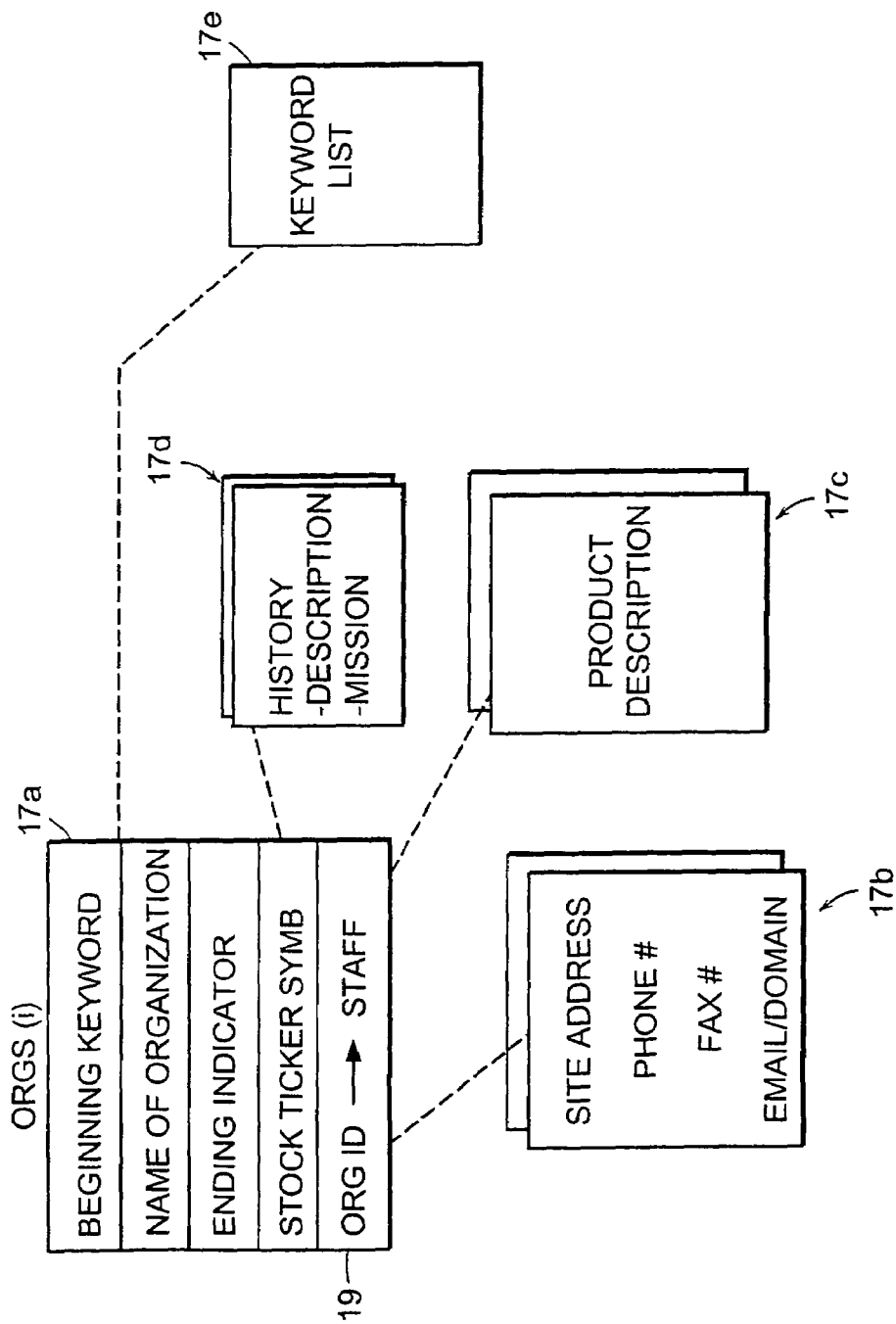

In one embodiment, the database/working records 16, 17 are structured as follows and illustrated in FIGS. 5a and 5b. There is one working record 16a, 17a for each "extracted" person or organization, i.e., extracted data pertaining to an individual or organization, respectively. The working record 16a in FIG. 5a stores the name of the person using respective fields for a prefix (Dr., Mr., Ms., etc.), first name, middle name, last name and suffix (M.D., Ph.D. . . . ).

Keyed by the person's name are one or more employment records 16b, i.e., a different employment record 16b for each position of employment held by the subject person. Each employment record 16b has a field indicating title of the person's position and corresponding organization's/employer's name and dates that position/title was held. The employment record 16b also has a flag (bit field) 51 indicating whether this employment record represents the person's primary employment. There are also fields indicating the geographic location of the respective employer (city, state, region) and a link to personal contact data records 16e for the subject person. The contact data records 16e include the person's street address, phone number, facsimile number and email address.

Also keyed by the subject person's name are one or more education records 16c, i.e., a different education record 16c for each degree earned by the person. Each education record 16c has a respective field for indicating degree earned, major (or field of study), institution awarding the degree and graduation date.

A copy of the biographical text or original text from which Extractor 41 reaped the information for records 16a, b, c, e is stored in a record 16d. Record 16d is keyed by the subject person's name.

In a like manner for organizations, there is one working record 17a per subject organization. The main working record 17a indicates name of the organization, stock ticker symbol (if any) and a unique identification code 19 which links or points to records 16 of individuals associated with the organization. Keyed off the organization name are site records 17b containing address, phone/fax number and domain URL for each of the various sites of the organization. Product records 17c hold product information, one record 17c per product. History records 17d store organization mission statement, organization description and other historical company information in a time ordered fashion, i.e., a different record 17d for each different year of the organization's existence.

Other records 16, 17 with other fields of information are suitable.

Returning to FIG. 1, the method described in the above information extraction 118 discussion requires that the sentence be successfully parsed. For some complex sentences, this is difficult to obtain. For this reason, Applicants also provide an alternative method. In that method, a list of rules is created where each rule describes a pattern to be found in a sentence. The pattern consists of a list of tokens where each token is either a noun phrase type or a specific word. Patterns must appear in succession but not necessarily without interruption. For instance: "=COMPANY announced=NAME will join=TITLE" would match the sentence "Acme Pluming inc. yesterday announced that Mr. John will join our company as Vice-President of sales". Each pattern also comprises information about how the resulting database record 16, 17 should be constructed from elements matching the working pattern. This includes, for example, a record type and a field name or position for all matching elements.

Finally, some information of interest within sentences are not expressed through syntax but simply by concatenating pieces of information with the use of punctuation. For instance, "Mr. John Smith, President, Acme inc., will give a talk . . . ". Rules are employed to recognize such occurrences. Those rules are sensitive to the succession of specific noun phrase types and punctuation within a sentence.

A person's or organization's name can appear along with relevant information on a non-sentence line separated by punctuation or formatting characters or within a succession of lines. Different methods have been devised by Applicants to construct desired database records 16, 17 from those cases.

In particular, a series of rules are utilized to express how pertinent information can appear. Those rules state the type and order of noun phrases and how to create the corresponding database records 16, 17. For instance, the succession in three different lines of a NAME, then a TITLE, and then a COMPANY can allow the creation of a work record comprising those 3 elements. Within some specific header or some specific groups of lines (as recognized through the methods described in step 111), it is possible to know with more accuracy how the information is going to be presented. Rules similar to the rules presented are then written but those rules only apply to specific sections.

Exemplary pseudo code for information extraction 118 in the preferred embodiment is as follows.

---

Information Extraction 118

```
FOR_EACH line Li in the document that is part of a cluster for at least
    1 person or organization
    IF Li is part of a cluster for more than 1 person/organization
        Divide line into parts corresponding to each person/organization
    END_IF
    IF Li is a sentence
        Associate information to person/organization by establishing
        relationship between elements in the sentence
        By parsing:
            Parse the sentence
            Extract information from sentence by associating syntactic
            relationship with semantic relationship
        By pattern matching:
            Look for special patterns of specific words and semantic
            types in the sentence and associate information with
            person/organization
        Identify if information is past or present
    ELSE
        Associate relevant items of information to person/organization
        (e.g. title, stock ticker symbol, address, phone number, etc)
    END_IF
END_FOR
```

---

Further it is useful to associate a list 17e (FIG. 5b) of keywords to a particular organization. This enables searches for organizations operating in certain domains or related to certain activities or products. In a preferred embodiment, keywords describing an organization are computed by calculating the recurrence of all noun phrases within interesting pages or all pages. As a function of the trade-off between coverage and accuracy some or all of the following rules are activated:

Pages used for keyword searching:
All pages for which a potential organization description was found are used, OR/AND
all pages mentioning the organization name are used, OR/AND
all other pages are used
Keywords to retain for computation:
all noun phrases that occur more than n times on a page, OR/AND
all noun phrases with at least n words
Keywords to retain at the end of the process:
the n most frequent keywords, OR/AND all keywords that appear more than n times, OR/AND
all keywords that appear on n pages or more, OR/AND
all keywords Furthermore, the list 17e of keywords may be complemented by the list of keywords appearing in meta-tags on the organization Web site.

Continuing with FIG. 1, post-processing 119 follows information extraction 118. Methods and algorithms described above extract "literal" information. That is, information that is explicit in the page and where elements of information are very close to one another (within the same sentence or within the same immediate group of lines). However, in many cases, relevant information can be deduced from a larger context. Applicants have discovered various methods to identify such information in post-processing step 119 illustrated in detail in FIG. 3 and discussed next.

Beginning with step 31 certain title modifiers are removed and record 16, 17 tense is affected. As information is extracted on a noun phrase basis, certain adjectival modifiers might be present at the beginning of a title. Such modifiers are inspected and depending on their meaning are:

simply removed (for instance, "Excellent Director of Marketing")

removed, affecting the record time field (for instance, "Former President")

left (for instance, "Robotic Division Manager")

Next organization names are detected in extracted job title information (step 33). That is, as information is extracted on a noun phrase basis, organization names might be included at the beginning of titles (for instance: "Acme President" and "International Robotic Association Vice-President of public relations"). Those names are recognized and separated at step 33. This is done by evaluating different split points in the title and attempting to identify the string resulting from such a split as an organization name by (a) matching with other occurrences of organization names on the page or site, (b) recognizing an organization name through semantic typing rules, (c) matching with a list of names of well-known organizations, or (d) matching the organization name against domain names appearing in URLs on the page.

Figure 3:
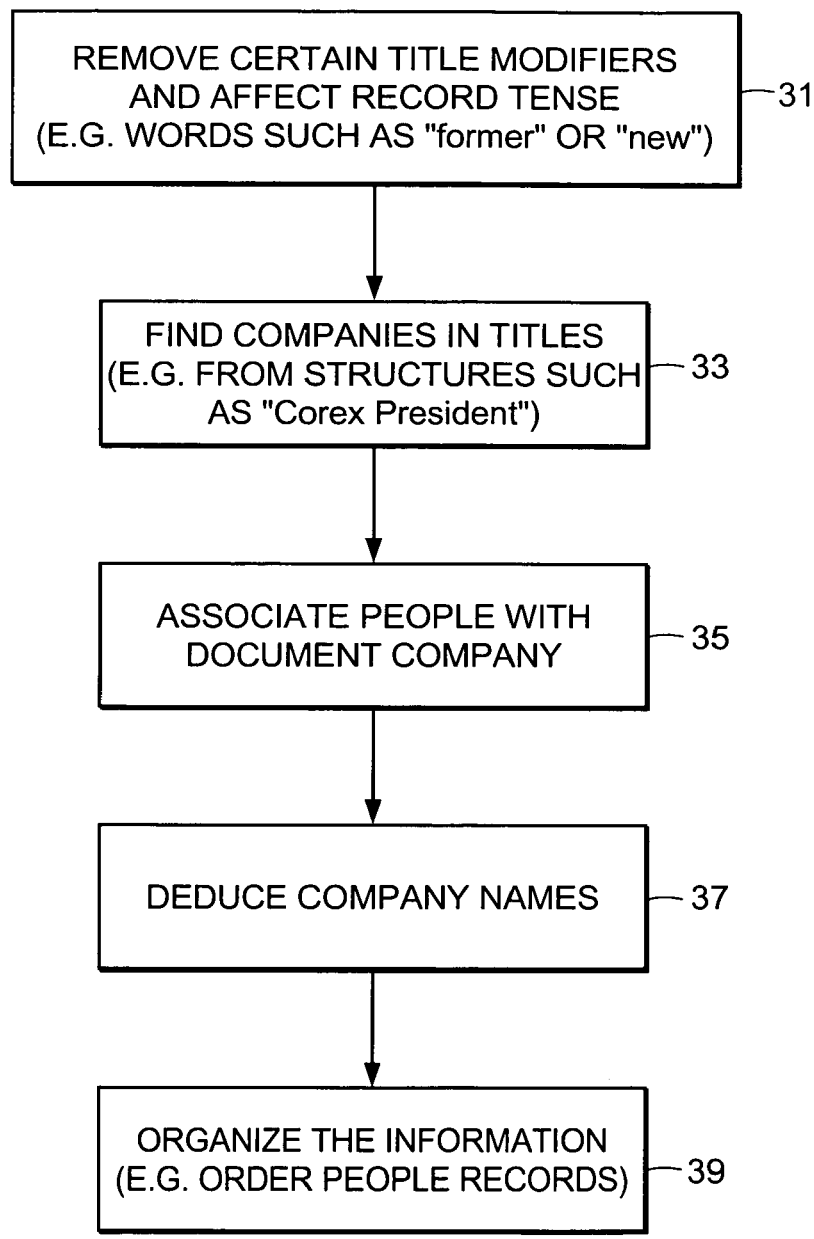
FIG. 3 is a flow chart of post-processing actions performed on information extracted from a Web page by the extractor of FIG. 1.

Connecting people with company/organization through page type and headers is performed at step 35 (FIG. 3). When a page contains a list of names of people working for a certain organization, the organization will often be mentioned only once or not at all (in the case where those people work for the organization on the Web site in which this page was found). To that end, people can be linked to the correct organization through different methods as follows:

(a) By recognizing the page as a staff list with the use of a Bayesian engine (see Invention 3 as disclosed in the related Provisional Application No. 60/221,750 filed on Jul. 31, 2000 for a "Computer Database Method and Apparatus"). In that case, the post-processing program 119 can assume that all people with titles mentioned on the page work for the organization to which the Web site belongs.

(b) By identifying (through the method described in step 111 of FIG. 1) that the list(s) of people names is/are headed by an organization name. People can then be associated with the organization whose name is in this header.

(c) By recognizing special "staff" headers through the method described in step 111 of FIG. 1. Those headers can vary in nature and can also help in distinguishing between different kinds of roles within an organization (e.g.: "Board of directors", "Executive Officers", etc.).

(d) Connecting people with organizations in Press Release: Typically, when a press release concerns an organization, the organization is mentioned in the first sentence. Often, people connected with this organization will be mentioned later in the text without mentioning again the organization name. Extracted names of people can be then connected to the organization mentioned in the press release (as long as the document is identified as a press release and the person is mentioned with a title but without an organization).

(e) Connecting people with organization through e-mail: Often, an e-mail address can be attached to a person's name but no corresponding organization name can be found through the above methods. In that case, if the domain in the email address can be matched with any of the organization names that appear on that page (or an abbreviation of such names) the person is linked to the corresponding organization at step 35 (FIG. 3).

Deducing organization names in biographical texts follows in step 37 of FIG. 3. When a paragraph of text describes the history of a person at an organization, normally the organization name will not be repeated in each sentence but can be assumed from the context. Applicants have devised a method to establish a logical relation across different sentences in a text in order to identify such occurrences. This method relies on the type and tense of the verb in each sentence and on the presence of particular adverbs and dates. For instance if sentence A states that a person worked (in the past) at a certain organization X and sentence B states that the same person was promoted (passive tense) to a certain position, it can be assumed that the organization in sentence B is X. Further evidence can be obtained by the presence of some adverbs (e.g.: "then", "later", etc.) and dates (e.g.: "in September 98"). In the preferred embodiment, Applicants utilize rules that express those cases. Those rules express conditions to be found in pairs of sentences.

Once all information for a person or organization has been extracted from a page, it is necessary to identify which of the different elements of information is the most important for this person/organization (e.g.: which title is the main title for this person or which occupation is the current most important one, or which name is the current one for this organization). Also, when there is a chronology of past employment or company history, it is necessary to order this information. This is accomplished at step 39 (FIG. 3) as follows.

First the main record 16, 17 is identified. This is based on a certain order of preference:

information on lines is preferred to information in sentences information on more prominent lines is preferable present tense sentences are preferred to past explicit information is preferred to deduced information Next, the chronology is established. It cannot be assumed that a biography will present the order of employment in a strict uniform fashion. Biographical texts must be analyzed to differentiate between different styles. In the preferred embodiment, step 39 does this in two prongs. In one prong, an ordering of employment at each different organization is made. This may be from (i) past to present, or, (ii) from present to past. This only indicates the general order of groups of sentences related to the same organization but not the order within each paragraph.

In the second prong, step 39 places in order the extracted titles or the subject person within the same organization.

Each paragraph or group of lines can use a different style and different paragraphs within the same biographies can have different styles. There are three possibilities: (i) from most recent, (ii) from least recent, (iii) the first sentence is the most recent position but then it continues with the least recent and onwards.

Rules for establishing this chronology are based on keywords (e.g.: "started", "joined", "later", etc.), explicit dates, and sentence construction (e.g.: "X came from Acme where . . . "). Similarly, chronology of organizations history (events) is established through respective rules based on keywords, explicit dates and sentence construction.

Information extracted through the processes described here will contain a certain proportion of errors. Those errors can be due to a variety of sources such as orthographic and grammatical mistakes in documents, non-standard document formats, highly complex documents, etc. Many methods to detect and possibly correct errors are employed in the post-processing phase 119. This includes among others: (i) reformatting and standardization of titles, (ii) reformatting and standardization of organization names.

Furthermore, because various methods are used to locate and link information and because each method can have different trade-offs between coverage and accuracy, it is possible to associate a confidence level with all pieces of information with the collection of information within a record 16, 17 (FIG. 4). This level of confidence can be used to establish a rank between different records 16, 17 or to reject or hide certain records 16, 17.

Referring back to FIG. 4, the loader 43 is responsive to the working records 16, 17 produced by Extractor 41. In the preferred embodiment, loader 43 identifies whether two records 16 relate to the same person at the same current position or whether two records 17 relate to the same organization. In addition, it is very common in a language to use different words and abbreviations that basically mean the same thing. In order for the loader 43 to properly identify people and organizations and to collect all relevant data about them it is necessary to identify and resolve all such aliases, a process called aliasing resolution. The loader 43 accomplishes detection/deletion of effectively duplicate records 16, 17 and aliasing resolution of people names, organization names and titles as follows.

Each individual person can appear in multiple locations on the Web, either on several pages within a Web site or on multiple Web sites. In order to provide the maximum value in the results database 45 (FIG. 4), these different references must be combined so that all of the information about a person can be presented.

The first step towards identifying two people as being the same actual person is to match the names. A name consists of five parts: a prefix (Mr., Ms., Dr., etc.), a first name (Jennifer, Jen, William, Bill, etc.), a middle name (Alex, A., etc.), a last name (Johnson, Smith, Jones, etc.), and a suffix (Jr., Sr., III, etc.).

In order for two given names of individuals to match, the last name must match exactly. The first names must either match exactly, or they must be valid aliases or "nicknames" for each other (Jim and James, for example). A list of valid first name aliases compiled from U.S. Census data is employed by loader 43.

The prefix, suffix, and middle names must not conflict, but do not necessarily need to match. This means that if one of the given names has one of these fields, but the other does not, they can match. So, Mr. Jean Smith and Jean A. Smith III are valid matches, but Mr. Jean A. Smith and Ms. Jean A. Smith are not. Similarly, abbreviations can be matched, so Jean Angus Smith and Jean A. Smith match.

Once a potential match has been identified, the organization names as stored in corresponding employment records 16*b* must be compared to see if they match. Many organizations will have two people with the same name, so a match between the organization names and the person's name is not a 100% guarantee that they are the same person. However, the odds that both people will be found on the Internet by this system are low, so they can generally be considered to be the same person. Errors of this nature are considered acceptable.

Matching two given organization names is complicated, since IBM, International Business Machines Corporation, IBM Corp., IBM Corporation, and International Business Machines Corp. are all the same organization. The first step is to find each word in the longer name within the smaller name. Organization identifiers such as "Corporation" must be aliased so that "Corp." and "Corporation" match each other. If all of the words in the longer string match words in the shorter string in the right order and there are no leftover words in the shorter string, they can be said to match. If there are leftover words in one string or the other (but not both) that are basic organization identifiers, like "Corporation", they can also be said to match.

If the loader 43 does not produce a match, but the shorter name contains an acronym or a word with all capital letters, the loader 43 checks if there is a string of words in the longer name that (i) start with those letters, in order or that (ii) one can construct the acronym by taking one or more letters from each word in the right order. For example, IBM and International Business Machines Corp. or American Express and AMEX. If there is such a group of words, the given strings can be said to match.

Another test for organization name matching is to compare the organization Web site domains, if known. For example, if www.dragon.com is the Web site domain for both Dragon Systems Inc. and DSI, then it can be inferred that DSI is probably an alias of Dragon Systems Inc (the smaller string is usually considered to be an alias of the longer string).

A person in their lifetime can be associated with several organizations. Because information on the Internet can be dated, it is important to compare all organizations that a person has worked for when trying to find a match in organizations.

Locale can also be a factor in matching organizations. Many peoples' organizations are mentioned in relation to their geographical location ("The Internet is extraordinary," said Jonathan Stern, CEO of Corex Technologies in Cambridge, Mass.). If locale information for the organization is available, it must not conflict. So, "Corex" matches "Corex in Cambridge, Mass." and "Corex in Massachusetts", but "Corex in Trenton, N.J." does not match "Corex in Massachusetts".

Titles can also be written in different ways yet mean basically the same. For example Vice President and VP are completely interchangeable. The loader program 43 contains a list of common shorthand for titles including: VP, CEO (for Chief Executive Officer), CIO (Chief Information Officer), etc.

In addition, words within the title can shuffle without changing the meaning for example: Vice President of Marketing or Marketing VP, Director of Quality Assurance and QA Director. Titles are aliased if they have identical meaning in English, as defined by the Extractor 41.

The problem can be even bigger when the title is paraphrased. For example the title President and title CEO are interchangeable in many small companies, the title Manager and the title Director are many times swapped. For this reason, the loader program 43 also contains a list of titles that are likely to be swapped.

At the database 45 level, the same process used to conclude that two given organizations are the same can be used to tie a person to an organization as well as to another person. Information about an organization is also stored in the database 45, including the host name, the location of the organization, a description, etc. By storing the database id 19 (FIGS. 5*a*, 5*b*) of the organization that the person works for, sophisticated queries can be run that will search for people based on the organization they work for, in addition to information about the person itself. For example, assume that a person in the database 45, John Smith, is a software engineer who works for Dragon Systems, a speech recognition software company. A search can be performed for software engineers who work for companies involved in speech recognition, even if nowhere in the information about John Smith himself does it mention speech recognition.

While this invention has been particularly shown and described with references to preferred embodiments thereof, it will be understood by those skilled in the art that various changes in form and details may be made therein without departing from the scope of the invention encompassed by the appended claims.

For example, the term "organization" is meant to refer to various entities such as companies, business entities, non-profit groups, associations, etc. As such, individuals associated with any such organizations may be employees, staff, officers, members, and so forth. The foregoing discussion is understood to encompass these roles/positions and broader interpretations of the terms "organization" and "employment" or relationship to an organization.

The Loader 43 may also normalize the extracted data before storing records 16, 17 in database 45. Normalizing includes case usage (upper case letters versus lower case letters), punctuation, usage of special characters, spacing and the like.

It is understood that the various described modules (crawler 11, extractor 41 and loader 43) may be implemented in various combinations, architectures and the like. Distributed processing, network processing and so forth may execute these modules. Likewise the above-described functions and operations in the preferred embodiment of extractor 41 and loader 43 are for purposes of illustration and not limitation.

What is claimed is:

1. A method for extracting data from a Web page comprising the computer-implemented steps of:
   using natural language processing, finding possible formal names on a given Web page, the step of finding producing a first found set of formal names;
   searching the given Web page for formal names not found by the natural language processing step of finding, said searching using pattern matching technicues and producing a second set of formal names; and
   refining a combined set of formal names formed of the first found set and the second set, said refining producing a working set of people and organization names extracted from the given Web page.

2. A method as claimed in claim 1 wherein the step of refining includes rejecting predefined formal names as not being people names of interest.

3. A method as claimed in claim 1 wherein the step of refining includes determining aliases of respective people and organization names in the combined set, so as to reduce effective duplicate names.

4. A method as claimed in claim 1 wherein the step of finding further finds professional titles and determines organization for which a person named on the given Web page holds that title.

5. A method as claimed in claim 4 wherein the step of finding includes employing rules to extract at least title and formal names.

6. A method as claimed in claim 1 wherein the step of finding further includes determining educational background of a person named on the given Web page, the educational background including at least one of name of institution, degree earned from the institution and date of graduation from the institution.

7. A method as claimed in claim 1 wherein the step of finding further includes determining biographical information relating to a person named on the given Web page.

8. A method as claimed in claim 7 wherein the step of determining biographical information includes determining current and previous employment history of the named person.

9. A method as claimed in claim 1 further comprising the steps of:
   determining type of the given Web page; and
   from the determined type, defining contents of different portions of the Web page, such that the steps of finding and searching are performed as a function of the defined contents.

10. A method as claimed in claim 9 wherein the step of determining type of the given Web page includes determining structure or arrangement of contents of the Web page.

11. A method as claimed in claim 10 further comprising the step of using the determined type, deducing additional information regarding a named person or organization on the given Web page, the additional information supplementing information found on another Web page of a same Web site as the given Web page.

12. A method as claimed in claim 1 wherein the step of finding further includes determining at least one of addresses, telephone number, and email address relating to a person or organization named on the given Web page.

13. A method for extracting information from a Web page document comprising the computer implemented steps of:
   performing a lexical analysis on a given Web page document to identify elements of interest, the elements of interest producing formal names;
   detecting a regular recurrence of a certain type of element throughout the given web pane document, the detecting producing additional formal names;
   resolving aliases of the produced formal names and additional formal names to form a working set of names of people and/or organizations named in the given Web page document.

14. A method as claimed in claim 13, further comprising the step of transforming the given Web page document into a standardized form, the step of transforming including identifying page structure of the Web page document.

15. A method as claimed in claim 13, further comprising the step of assigning a type to each line in the given Web page document, the step of assigning a type indicating purpose of each line in the given Web page document.

16. A method as claimed in claim 15 wherein the step of performing a lexical analysis further identifies elements of interest on lines of certain assigned types.

17. A method as claimed in claim 15 wherein the step of detecting includes using pattern matching, detecting a regular recurrence of a certain type of line, to produce additional formal names.

18. A method as claimed in claim 13 wherein the step of performing a lexical analysis includes syntactically and grammatically identifying elements of interest.

19. A method as claimed in claim 18 wherein the step of identifying elements of interest identifies noun phrases that correspond to a person or organization named in the given Web page document.

20. A method as claimed in claim 18 wherein the step of performing a lexical analysis includes using natural language processing.

21. A method as claimed in claim 18 wherein the step of performing a lexical analysis includes utilizing rules describing composition of a name.

22. A method as claimed in claim 13 wherein the step of resolving aliases includes employing rules for determining variant versions of a person's name or an organization's name.

23. A method as claimed in claim 13 wherein the step of aliasing includes rejecting names containing predefined forms of common known phrases.

24. A method as claimed in claim 13 further comprising the steps of:
grouping subsets of lines together to form respective text units; and
extracting from the formed text units desired information relating to the people or organizations named in the given Web page document
wherein the step of grouping identifies boundaries where information about a person or organization is to be found.

25. A method as claimed in claim 24 wherein the step of grouping recognizes elements of information that span across more than one line.

26. A method as claimed in claim 24 wherein the step of extracting includes:
determining type of Web page document; and
from the determined type, defining contents of different portions of the Web page document such that extraction is performed as a function of the defined contents.

27. A method as claimed in claim 26 wherein the step of determining type of Web page document includes determining structure and organization of contents of the document.

28. A method as claimed in claim 26 wherein the step of extracting includes determining whether the given Web page document is a press release, and if so, identifying organization mentioned in the press release.

29. A method as claimed in claim 24 wherein the step of extracting includes using a parser to recognize the relationship between elements of information.

30. A method as claimed in claim 29 wherein the step of extracting further includes utilizing predefined semantic frames for determining (i) sentences that express a relationship between a person and organization named in the given Web page document and (ii) sentences that express that a person has a certain level of education.

31. A method as claimed in claim 24 wherein the step of extracting includes associating a person or organization with an element of information if said element appears in a non-sentence within a formed text unit for that person or organization.

32. A method as claimed in claim 24 wherein the step of extracting further divides a line that contains multiple names.

33. A method as claimed in claim 24 wherein the step of extracting is rules based.

34. A method as claimed in claim 13 further comprising the step of post-processing to extract further names of organizations and relationships to people named in the given Web page document.

35. A method as claimed in claim 34 wherein the step of post-processing includes:
extracting organization names from professional titles held by a named person;
associating a named person with an organization whose Web site is hosting the given Web page document; and
deducing organization names from biographical text of a named person.

36. Computer apparatus for extracting information from a Web page comprising:
a source of Web pages of interest;
an extractor coupled to receive Web pages from the source, the extractor being computer implemented and using natural language processing to extract desired information from the Web pages; and
a storage subsystem coupled to the extractor for storing the extracted desired information in a data store;
wherein the extractor extracts desired information from a given Web pane by:
using natural language processing, finding possible formal names on a given Web page, the step of finding producing a first found set of formal names:
using pattern matching, searching the given Web page for formal names not found by the natural language processing sten of finding, said searching producing a second set of formal names; and
refining a combined set of formal names formed of the first found set and the second set, said refining producing a working set of people and organization names extracted from the given Web page.

37. Computer apparatus as claimed in claim 36 wherein the extractor further determines aliases of respective people and organization names in the combined set so as to reduce effectively duplicate names.

38. Computer apparatus as claimed in claim 36 wherein the extractor further finds professional titles and determines organization for which a person named on the given Web page holds that title.

39. Computer apparatus as claimed in claim 36 wherein the extractor further determines educational background of a person including at least one of name of institution, degree earned from the institution and date of graduation from the institution.

40. Computer apparatus as claimed in claim 36 wherein the extractor further determines employment history of a person named on the given Web page.

41. Computer apparatus as claimed in claim 36 wherein the extractor is rules based.

42. Computer apparatus as claimed in claim 36 wherein the extractor further determines type of the given Web page, and from the determined type defines contents of different portions of the Web page, such that extraction of desired information is performed as a function of the defined contents.

43. Computer apparatus as claimed in claim 42 wherein the extractor further using the determined type, deduces additional information regarding a named person on the given Web page, the additional information supplementing information found on another Web page of the same Web site as the given Web page.

44. Computer apparatus as claimed in claim 36 wherein the extracted desired information includes names of people or organizations named on the given Web page, addresses, telephone numbers and email addresses relating to the named person or organization.

45. Computer apparatus as claimed in claim 36 wherein the storage subsystem is formed of a loader responsive to the extracted desired information, the loader post-processing the extracted desired information to refine the extracted desired information for storage in the data store.

* * * * *

UNITED STATES PATENT AND TRADEMARK OFFICE
CERTIFICATE OF CORRECTION

PATENT NO. : 7,065,483 B2
APPLICATION NO. : 09/910169
DATED : June 20, 2006
INVENTOR(S) : Michel Decary et al.

It is certified that error appears in the above-identified patent and that said Letters Patent is hereby corrected as shown below:

<u>Column 22</u>
Claim 13, line 54, delete "pane" and insert ---page---.

<u>Column 24</u>
Claim 36, line 34, delete "sten" and insert ---step---.

Signed and Sealed this

Fifth Day of September, 2006

JON W. DUDAS
*Director of the United States Patent and Trademark Office*